G. W. KINTZ.
Potato-Digger.
No. 66,029. Patented June 25. 1867.
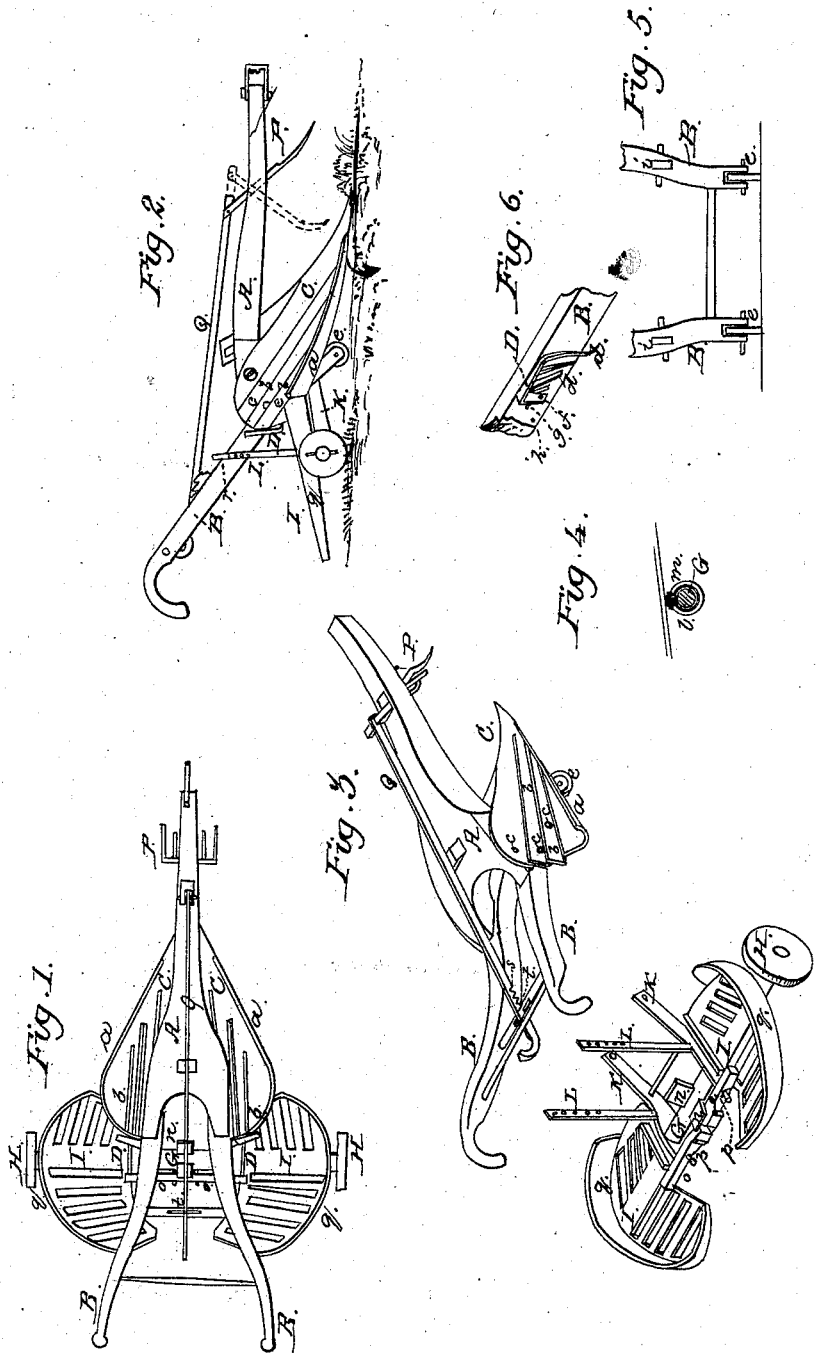

United States Patent Office.

GEORGE W. KINTZ, OF WEST HENRIETTA, NEW YORK.

Letters Patent No. 66,029, dated June 25, 1867.

IMPROVEMENT IN POTATO-DIGGERS.

*The Schedule referred to in these Letters Patent and making part of the same.*

TO ALL WHOM IT MAY CONCERN:

Be it known that I, GEORGE W. KINTZ, of West Henrietta, in the county of Monroe, and State of New York, have invented certain new and useful improvements in Potato-Diggers; and I do hereby declare that the following is a full and exact description thereof, reference being had to the accompanying drawings, making part of this specification.

Figure 1 is a plan of my improved digger.

Figure 2, an elevation thereof.

Figure 3, a perspective view, with the plough and the shaker arrangement separated.

Figures 4, 5, and 6, detail views.

Like letters of reference indicate corresponding parts in all the figures.

My invention consists in the arrangement of parts constituting the plough and shaker, as hereinafter set forth.

As represented in the drawings, A is a beam, and B B handles similar to those of an ordinary plough. With the beam is connected a double-winged mould-board, C, which passes centrally under the hills, and divides them, throwing a part each way. The outer edges $a\ a$ of the mould-board are turned up in scoop form, constituting flaps, as shown, so as to hold the potatoes, and guide them up and back to the shaker, which will be presently described. The wings of the mould-board are divided into series of slats $b\ b$, similar to the slats of a window-blind, and these are opened or closed by means of set-screws $c\ c$, or some equivalent device.

The arrangement above described forms a very effective potato-digger in itself. The turning of the hills in both directions effectually breaks the tubers from their stems, and in passing back over the wings of the mould-board, the dirt sifts through the slats $b\ b$, leaving the potatoes comparatively free and clean. It will be seen that by gauging the openings of these slats I can adjust the sifting just as desired, which is a matter of much importance in digging potatoes of different sizes, and in using the machine in soils of different kinds. These bars, ranging one above the other, have a tendency to slide the potatoes down laterally over the spaces, and thus sift them out, while the flaps $a$ prevent their dropping off sidewise. This arrangement of the slats, in connection with the double wings and the turned-up flaps, I regard as a most important feature in my invention. The ends of the handles are provided each with a small roller, $e$, which rests upon the ground. These rollers, by being situated at some distance apart, serve to retain the plough in an upright and level position without producing great strain upon the muscles of the operator. They also serve as a fulcrum to the leverage in raising the nose of the plough; and further, they lessen the friction in passing over the ground. Just at the rear of the wings of the mould-board combs or rakes D D are secured to the sides of the handles, consisting of teeth $d\ d\ d$ projecting downward with a slight forward curve. These combs are pivoted so as to turn at $f$ to adjust to different angles, and they are retained in any given position by pins $g$ on each side, fitting in sets of concentric adjusting holes $h$. The object of these combs is to catch the mass as it is thrown up by the mould-board, and break up and separate such portions as are not sifted out on the slats $b$. By making the combs adjustable to different positions it will be seen that this will be accomplished effectively, the teeth $d$ catching the mass and cutting it up, so that when it falls on the shaker below it will be readily separated. In the back sides of the handles are made mortises $i\ i$, in which are pivoted arms $k\ k$ of the shaker. The shaker consists of an axle, G, resting on wheels H H, and having slotted plates I I mounted each side of the centre, as shown. These plates are jointed to the axle, so as to have a free shaking action, by any suitable means, that represented in the drawings being lugs $l$, that are pivoted between similar lugs of a ring, $m$, encircling the axle. In this case the front ends of the plates are linked loosely to the plough to preserve the upright position. The position of the shaking-plates corresponds with the rear of the wings of the mould-board, so that the potatoes will drop thereon from the mould-board. The axle is provided centrally with cogs or teeth $n\ n$, which in their revolutions strike vibrating arms $o\ o$, pivoted at $p$, and projecting over the shaking-plates. The vibrations of these arms will give a shaking motion to the plates, and sift the dirt through the slots, while the potatoes will be worked off at the rear end in the centre in a row, easy to be picked. The plates are provided with outer rims $q\ q$ to prevent the potatoes falling off outside. The shaker is adjusted higher and lower relatively with the plough by braces L L, connecting with the handles, and having a set of adjusting holes, through which passes a pin, $r$. This arrangement of the shaker is such as to thoroughly sift the potatoes after they have passed from the mould-board and the combs. On being discharged in the rear they are perfectly clean of dirt and in the best condition to be picked. It will be seen that the shaker can be detached from the plough very readily, and the latter is then in condition for use alone, for furrowing, &c. In furrowing, the combs are useful for cutting up the soil as well as in digging potatoes. Near the front end of the beam I hang a vine-puller, P, which is preferably in the form of a fork, pivoted in the beam so as to have a range of motion in turning sufficient to catch and discharge the vines. To the upper end of the vine-puller is jointed a connecting-rod, Q, extending back within reach of the operator, and preferably provided with ratchet-teeth $s$, which engage with a sharp edge, $t$, to hold the vine-puller forward. When the puller gets full of the vines the operator throws the rod forward and the fork back, so as to discharge them, as indicated by red lines, fig. 2.

What I claim as my invention, and desire to secure by Letters Patent, is—

1. The double-winged mould-board plough, provided with the adjusting slats $b$ and flaps $a$, arranged and operating in the manner and for the purpose set forth.

2. The combination and arrangement of the adjustable combs D with the double-winged slatted mould-board C, operating in the manner and for the purpose specified.

3. The employment, in combination with the double-winged slatted mould-board, of the rollers $e\ e$, situated in the ends of the handles, as set forth.

4. The combination, with the double-winged slatted mould-board, of the shaker, composed of the plates I, vibrating arms $o$, and axle G, with cogs $n$ and the adjusting braces L, as set forth.

5. The employment of the pivoted vine-puller P with ratchet-rod Q, so arranged as to operate from the rear for discharging the vines, as herein set forth.

6. The arrangement of the machine as a whole, consisting of the slatted mould-board C, combs D, shaker I I, G, L, $n$, $o\ o$, and vine-puller P Q, as herein set forth.

In witness whereof I have hereunto signed my name in the presence of two subscribing witnesses.

GEO. W. KINTZ.

Witnesses:
R. F. OSGOOD,
J. A. DAVIS.